(12) United States Patent
Hoff et al.

(10) Patent No.: US 8,190,477 B2
(45) Date of Patent: May 29, 2012

(54) COMPUTING A TIME-DEPENDENT VARIABILITY VALUE

(75) Inventors: Aaron C. Hoff, Kirkland, WA (US); Paul R. Johns, Tacoma, WA (US); Scott Joseph Counts, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 851 days.

(21) Appl. No.: 12/054,390

(22) Filed: Mar. 25, 2008

(65) Prior Publication Data

US 2009/0248502 A1    Oct. 1, 2009

(51) Int. Cl.
*G06Q 30/00* (2012.01)
(52) U.S. Cl. ...................... 705/14.52; 705/1.1
(58) Field of Classification Search .................. None
See application file for complete search history.

(56) References Cited

U.S. PATENT DOCUMENTS

| | | | |
|---|---|---|---|
| 5,652,898 A | 7/1997 | Kaji | |
| 6,349,295 B1 | 2/2002 | Tedesco et al. | |
| 6,546,386 B1 | 4/2003 | Black et al. | |
| 7,131,117 B2 | 10/2006 | Mills et al. | |
| 2003/0037041 A1 | 2/2003 | Hertz | |
| 2004/0205451 A1 | 10/2004 | Kowalski | |
| 2006/0106755 A1* | 5/2006 | Stuhec | 707/1 |
| 2006/0155539 A1 | 7/2006 | Chen et al. | |
| 2006/0259473 A1* | 11/2006 | Li et al. | 707/3 |
| 2007/0016571 A1 | 1/2007 | Assadian et al. | |
| 2007/0112760 A1* | 5/2007 | Chea et al. | 707/5 |
| 2007/0225968 A1* | 9/2007 | Murakami et al. | 704/9 |
| 2008/0004864 A1 | 1/2008 | Gabrilovich et al. | |
| 2008/0086555 A1* | 4/2008 | Feinleib | 709/224 |

FOREIGN PATENT DOCUMENTS

WO    2007143914 A1    12/2007

OTHER PUBLICATIONS

Atlam, et al., "An Evaluation Method of Words Tendency using Decision Tree", Annual Meeting of the ACL, Proceedings of the 41st Annual Meeting on Association for Computational Linguistics—vol. 2, Japan, Year of Publication: 2003, pp. 129-132.
Lancaster, "Word Frequency Analysis as an Authoring Tool", Copyright 2005 as GuruGram #45, pp. 44.1-44.8.

* cited by examiner

*Primary Examiner* — Alexander Kalinowski
*Assistant Examiner* — John Scarito (57) ABSTRACT

A system that facilitates computation of a time-dependent variability value is described herein. The system includes a receiver component that receives a plurality of items, wherein each item has a timestamp corresponding thereto. The system further includes a value generator component that outputs a time-dependent variability value for an item in the plurality of items, wherein the time-dependent variability value is indicative of a recent frequency of use of the item in comparison to a frequency of use of the item over a defined period of time.

17 Claims, 11 Drawing Sheets

COMPUTING A TIME-DEPENDENT VARIABILITY VALUE

BACKGROUND

In the recent past, computing devices have increased in functionality and storage capacity while decreasing in cost. Accordingly, more and more people have access to computing devices that are capable of performing a myriad of tasks. Example tasks include document creation and editing; photograph, audio and/or video creation and editing; tracking investments; creation and editing of presentations; Internet browsing; amongst many other tasks.

Furthermore, many individuals who create content are becoming interested in sharing such content with others. For example, many individuals that create videos now desire to share such videos with others, wherein the videos may be accessible by way of the Internet, for example. In another example, individuals that publish scholarly articles may wish to have such articles published and accessible to the entire world. In yet another example, various online communities allow participants ("authors") to post messages to a server that is connected to the Internet, wherein the messages are available for consumption by one or more software programs. Examples of such communities include web-based message forums, e-mail discussion lists, blogs, wikis, amongst others. Many of these message forums indicate topics of message threads, and allow authors to write messages with respect to these topics. Furthermore, authors can reply to other author's messages, wherein such messages can be referred to as "reply-to" messages.

The proliferation of online communicates has resulted in a very large amount of end-user authored data. For instance, every day participants can add new content concerning a variety of topics. As message threads become larger and more and more authors post information to a message thread, however, efficiently locating data may be challenging. For instance, even though a message thread may initially be directed at a certain topic, over time or at certain instances in time additional, different topics or sub-topics may arise. A user that may be interested in one or more of the different topics or sub-topics may never know such topics have been discussed in a particular message thread. In another example, the user may spend an inordinate amount of time searching for information in a message thread.

SUMMARY

The following is a brief summary of subject matter that is described in greater detail herein. This summary is not intended to be limiting as to the scope of the claims.

Various technologies pertaining to determining an amount of recent change of frequency of use and/or interest with respect to an item (in comparison to historical frequency of use and/or interest with respect to the item) are described herein. More particularly, a plurality of items can have temporal information pertaining thereto, wherein the temporal information may indicate times that the items were used and/or created. For instance, the items may be words in messages of a message thread, and the temporal information may be timestamps corresponding to the messages (and therefore corresponding to words in the messages). In another example, the items may be authors of messages. In yet another example, the items may be query terms submitted to a search engine. In still yet another example, the items may be selections or visits to a website.

Based at least in part upon collected instances of items and temporal information corresponding thereto, a time-dependent variability value can be computed for at least one item. The time-dependent variability value can be indicative of a recent change in frequency of use/interest of an item in comparison to historic frequency of use/interest of the item. For instance, the time-dependent variability value can be indicative of a recent "buzz" with respect to the item.

A computed time-dependent variability value can be used in a variety of manners. For instance, an advertisement can be served based at least in part upon a time-dependent variability value. In an example, a message thread may experience a recent increased usage of a particular word, and an advertisement related to the word can be selected and presented. In another example, a time-dependent variability value can be used in connection with ranking search results. For instance, a time-dependent variability value can be indicative of a recent change in frequency of selection of visits to web site, and search results can be ordered based at least in part upon the value.

Other aspects will be appreciated upon reading and understanding the attached figures and description.

DETAILED DESCRIPTION

Various technologies pertaining to computing and/or using a time-dependent variability value will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

Figure 1:
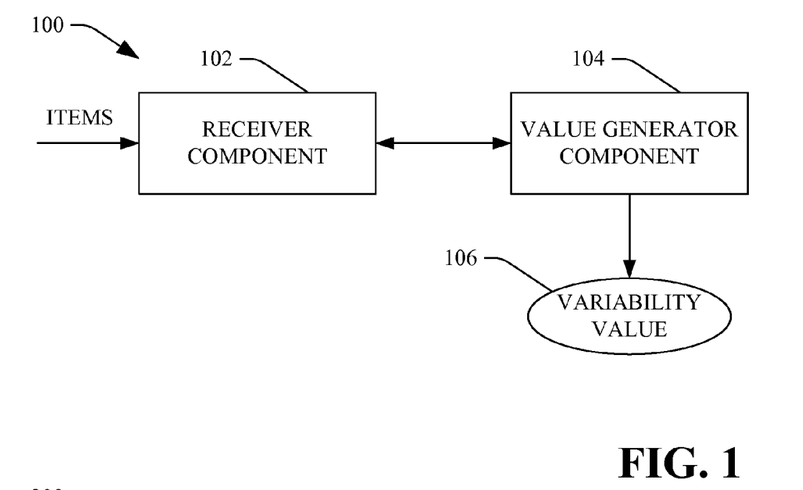
FIG. 1 is a functional block diagram of an example system that facilitates computing a time-dependent variability value.

With reference to FIG. 1, an example system 100 that facilitates computing a time-dependent variability value is illustrated. A time-dependent variability value can indicate that a certain item has recently been of greater interest to a user or users than interest associated with the item historically (e.g., over a defined period of time). As will be described in greater detail below, the item may be a word used in a message thread or message threads, an author of messages in a message thread or message threads, hits on a website, or other suitable item.

The system 100 includes a receiver component 102 that receives a plurality of items and temporal information corresponding to the items. As noted above, in an example, the items may be words in a message thread, and the temporal information may be timestamps corresponding to the items. For instance, each time an author posts a message in a message thread, a timestamp can be assigned to such message. Accordingly, each word in the message can be assigned a timestamp that corresponds to the message. In another example, the items may be authors of messages in a message thread, and the temporal information may be timestamps that correspond to messages authored by the authors. In still yet another example, the items may be hits on websites, and the temporal information may be timestamps that correspond to the hits. Other items are also contemplated and are intended to fall under the scope of the hereto-appended claims.

A value generator component 104 outputs a time-dependent variability value 106 for an item in the plurality of items. The time-dependent variability value 106 is indicative of a recent frequency of use of the item in comparison to a frequency of use of the item over a defined period of time. More particularly, the time-dependent variability value 106 can be used to indicate which item or items have experienced a recent increase in use/interest in comparison to historical use/interest of the item. In a specific example, a message thread may include several messages that are posted on a web server with respect to a particular topic, and the items may be words in messages of the message thread. As more messages are posted, different words or topics can be used over different periods of time. The time-dependent variability value 106 can indicate which words are the words that are associated with "buzz". In other words, the time-dependent variability value 106 can be used to determine words that are experiencing higher use in the message thread.

The value generator component 104 can use a variety of mechanisms for computing the time-dependent variability value 106. In an example, the value generator component 104 can determine frequencies of use of an item over various ranges of time, and can output the time-dependent variability value 106 based at least in part upon determined frequencies of use. For instance, the value generator component 104 can determine that, for a first period of time, that a frequency of use of an item is a first percentage (e.g., 1% of items used in the first period of time are the item). The value generator component 104 can also determine that, for a second period of time (e.g., a period of time that is adjacent to the first period of time), that a frequency of use of the item is a second percentage (e.g., 2% of items used in the second period of time are the item). The value generator component 104 may output the time-dependent variability value 106 based at least in part upon a comparison of the first and second frequencies. Another more detailed algorithm for computing the time-dependent variability value 106 is described in greater detail below.

The time-dependent variability value 106 may be used in a variety of manners. For instance, a word or collection of words can be highlighted in a message thread to indicate that it is associated with a recent increase in interest. In another example, words can be graphically presented beside a title of a message thread to indicate what is currently being discussed in the message thread. In yet another example, search results can be ranked based at least in part upon items that are found to be of recent interest (in comparison with previous interest). In still yet another example, advertisements can be served based at least in part upon the time-dependent variability value 106.

Figure 2:
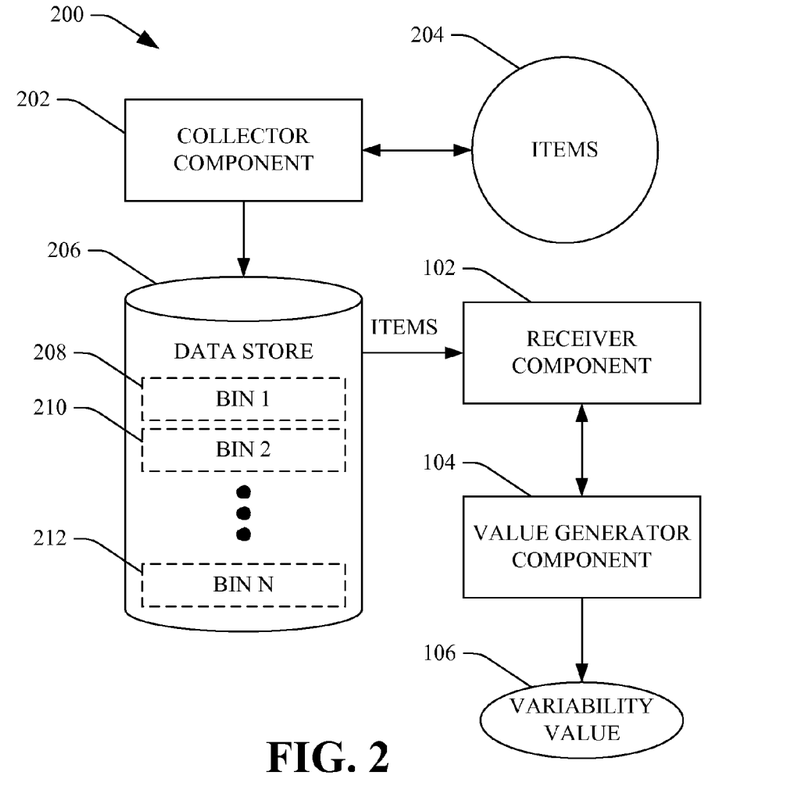
FIG. 2 is a functional block diagram of an example system that facilitates placing items in storage bins in accordance with temporal information corresponding to the items.

With reference now to FIG. 2, an example system 200 that facilitates computing a time-dependent variability value for an item is illustrated. The system 200 includes a collector component 202 that collects certain items from a plurality of items 204. A data store 206 that includes a plurality of storage bins 208-212 can be used to store instances of items collected by the collector component 202. For instance, each of the storage bins 208-212 may be used to store instances of items that correspond to a particular period of time. In an example, the first storage bin 208 may be used to store instances of items that correspond to a first day, the second storage bin 210 may be used to store instances of items that correspond to a second day, etc. Pursuant to an example, the items may be words in a message threads, and the collector component 202 can collect a particular word. Each instance of the particular word that was authored on a first day can be stored in the first storage bin 210, each instance of the particular word that was authored on a second day can be stored in the second storage bin 212, etc. In another example, the collector component 202, rather than collecting items, can count a number of instances of an item in the collection of items 204 with respect to time periods corresponding to the storage bins 208-212. These counts may then be placed in the storage bins 208-212. Accordingly, for instance, a bin may include a number that is indicative of a number of times that the particular item has been used in a time period corresponding to the bin.

In still yet another example, the collector component 202 can collect each instance of each item in the collection of items 204, and can store instances of items in bins based at least in part upon the time period corresponding to the instances of the items. In an example, the collection of items 204 may be words in one or more messages in a message thread, wherein the messages (and therefore words) have a timestamp corresponding thereto. The collector component 202 can break up each message into distinct constituent words of each message, and each word can be assigned to one of the bins 208-212 based at least in part upon a timestamp corresponding to the words, and wherein each of the bins 208-212 corresponds to a particular unit or period of time. Thus, for example, each word whose timestamp occurred on a particular day can be assigned to a bin for such day. Furthermore, the bins 208-212 can preserve relationships between the word and message of origin, as well as between a message and its author, community, and thread.

The system 200 also includes the receiver component 102, which can receive information from the data store 206. For instance, the receiver component 102 may receive information with respect to a particular item from the data store 204 (e.g., from the bins 208-212). The value generator component 104 can receive the information and output the time-dependent variability value 106 for the item based at least in part upon information received from the receiver component 102.

Figure 3:
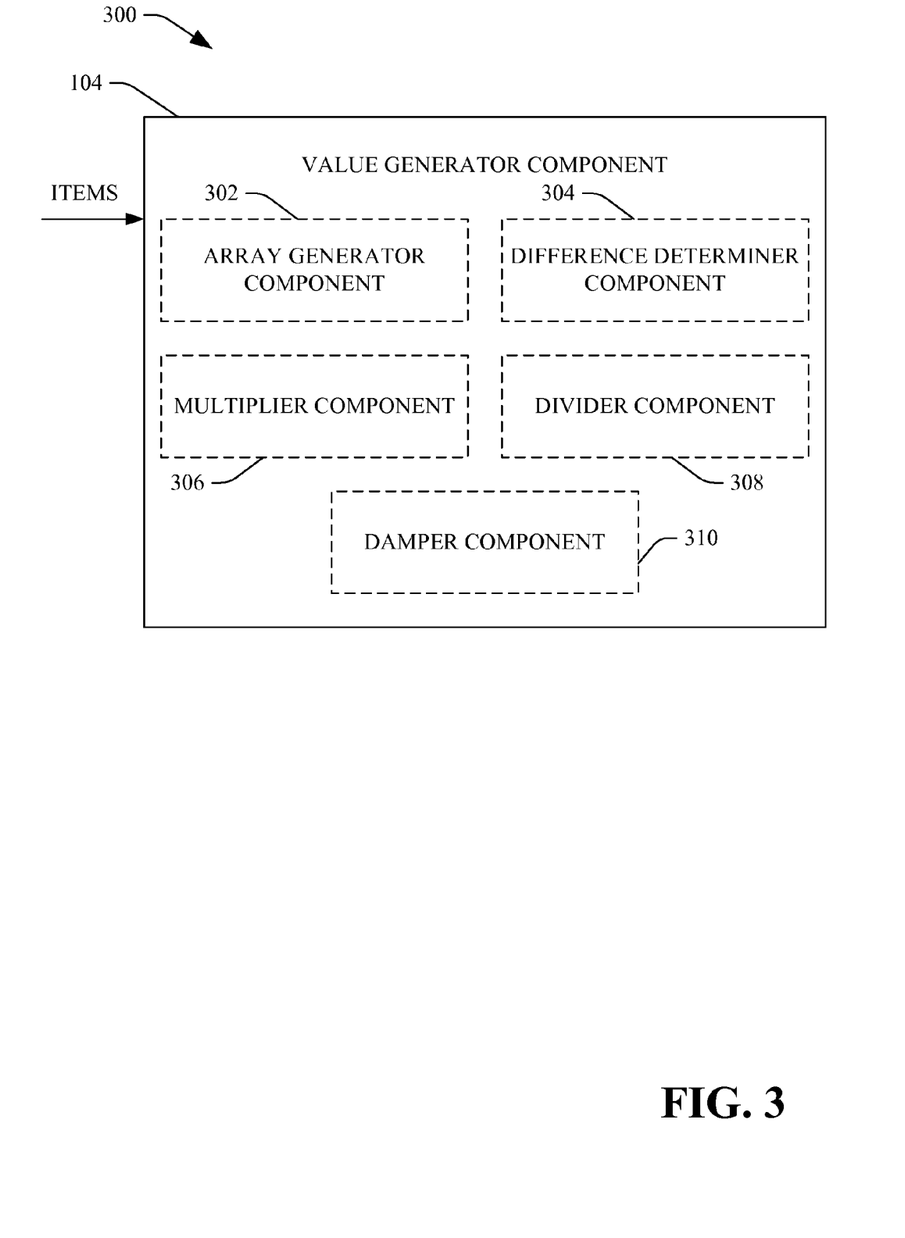
FIG. 3 is a functional block diagram of an example component that is used to compute a time-dependent variability value.

Now referring to FIG. 3, example contents of the value generator component 104 are depicted. The value generator component 104 is illustrated as including an array generator component 302 that determines a number of occurrences of a particular item with respect to certain periods of time and generates an array (in chronologically descending order)

based at least in part upon the number of occurrences of the item with respect to the certain time periods. Pursuant to an example, consecutive elements in an array generated by the array generator component 302 can represent consecutive time periods. In another example, the array generator component 302 can use information from the bins 208-212 (FIG. 2) when creating the array.

In a specific example, the item may be a particular word in messages of one or more message threads, and the time period may be days. It is to be understood, however, that any suitable time period may be used.

The array generator component 302 can also include elements in the array corresponding to a particular reference date. For instance, the array generator component 302 can add zero-valued elements to the beginning of the array up to and including the time duration associated with the aforementioned reference date.

A difference determiner component 304 can determine differences between consecutive elements in the array. More specifically, the difference determiner component 304 can determine a difference between each element and the element that immediately follows each element except where the element in the next position of the array is zero. Where an element in a next position is zero, the difference determiner component 304 does not determine a difference, and the input value is preserved. With respect to the last element, which has no follower, the difference determiner component 304 can truncate such element from the array.

The value generator component 104 can also include a multiplier component 306 that multiplies the computed differences by an absolute value of the same computed differences.

A divider component 308 may then divide the results by the immediately following element used to compute each respective difference.

The value generator component 104 may also include a damper component 310 that multiplies each element in the resultant array by a damping factor. For instance, the damper component 310 can compute a damping factor, which may be computed by taking the exponential of the negative of the array index of a particular element in the resultant array. The damper component 310 may use a constant multiplier to ensure that final values fall within a desired range. Pursuant to an example, the index for the third element in the resultant array is 2, and therefore the damping factor can be $e^{-k2}$, where k is an arbitrary constant greater than zero which can be selected based upon a particular implementation of the value generator component 104. The damper component 310 can apply the damping factors to each element of the resultant array to create a final array. Values of the final array can be summed, and the resultant sum can be the time-dependent variability value 106.

The actions undertaken by the value generator component 104 can be expressed mathematically as follows: given an array of integers $a_i$ of length N, a time-dependent variability value p can be defined such that $$p = \sum_{0}^{N-2} b_i,$$

where

-continued $$b_i = e^{-ki} \begin{cases} \frac{(a_i - a_{i+1})|a_i - a_{i+1}|}{a_{i+1}}, & a_{i+1} > 0 \\ a_i, & a_{i+1} = 0, \end{cases}$$

and where k is an arbitrary constant that is greater than zero.

While the value generator component 104 has been described as including the array generator component 302, the difference determiner component 304, the multiplier component 306, the divider component 308, and the damper component 310 as collectively performing certain operations to determine the time-dependent variability value 106, it is to be ascertained that the value generator component 104 can use other mechanisms for determining the time-dependent variability value 106. For instance, as described above, frequencies for particular time periods can be determined and compared to generate the time-dependent variability value 106.

Figure 4:
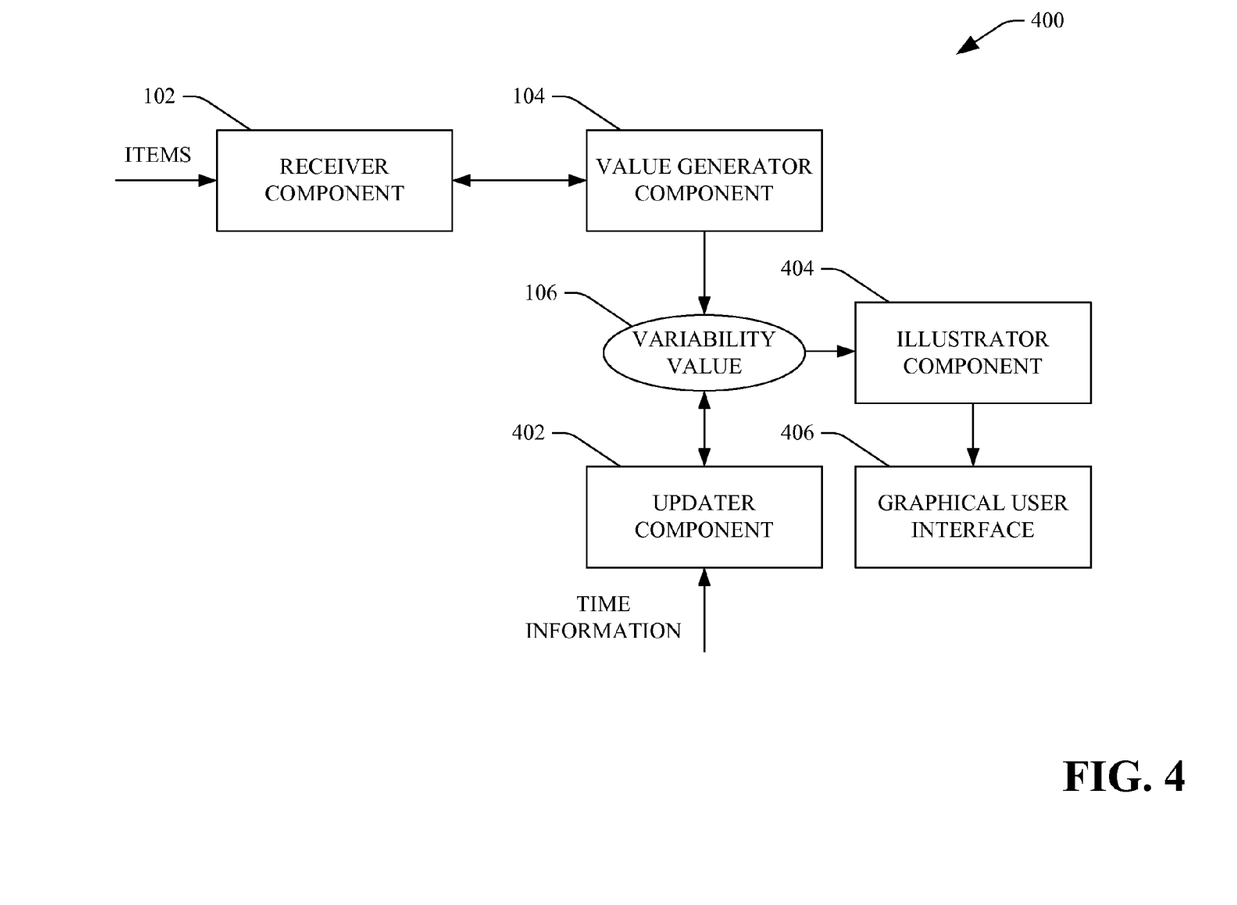
FIG. 4 is a functional block diagram of an example component that facilitates updating a time-dependent variability value.

Turning now to FIG. 4, an example system 400 that facilitates determining a time-dependent variability value is illustrated. The system 400 includes the receiver component 102 and the value generator component 104, which act in conjunction to generate the time-dependent variability value 106. The system 400 also includes an updater component 402 that can update an existing time-dependent variability value 106. The time-dependent variability value 106 is dependent on time, such that the value 106 for an item at one reference data will most likely be different from the value 106 for the item at a different reference date. More specifically, as time passes, more items may be generated, collected, and stored, and such items can contribute to the value 106. In addition, the example damping factor described above can diminish contribution of frequency changes for dates prior to a reference date. In an example, it may be desirably to compute a time-dependent variability value for each word in a message thread. To compare variability values for each of the words, however, it may be necessary to know a time-dependent variability value for each word at a particular time. Computing each value "from scratch" would be computationally expensive.

The updater component 402 can use an existing time-dependent variability value to update the time-dependent variability value. More particularly, a variability value for each item can be computed and stored each time an instance of an item is recorded, and a date and time when such computation occurred can be stored as a "value timestamp." Once the value and value timestamp have been stored, the updater component 402 can update a time-dependent variability value by multiplying the stored value by a new damping factor (which accounts for an intervening time). For example, if the time-dependent variability value 106 (p) is computed for a particular item on day 1, and it is desirably to compute an update to the value 106 (p') on day 6, the updater component 402 can compute a time difference (e.g., 5 days) and apply a following damping parameter:

$$p' = pe^{-k\Delta t},$$

where in this example t is time and is in the form of a day, and k is a constant. Accordingly, continuing with the above example, $\Delta t=5$. Due to the linearity of the equation, the updater component 402 can update a large number of time-dependent variability values for comparison.

The system 400 further includes an illustrator component 404 that can illustrate an item based at least in part upon a time-dependent variability value corresponding to the item. Pursuant to an example, the item may be a word in a message thread, and such word may have a high time-dependent variability value in comparison to other words in the message thread. The illustrator component 404 can present such word on a graphical user interface 406 to convey to readers of the message thread that the word is being used more frequently at a current time when compared to historic use of the word. In other words, the illustrator component 404 can convey to users that a certain item has a positive "buzz" about the item. The illustrator component 404 can illustrate an item various ways. For instance, the illustrator component 404 can depict the item in a textual manner, in a graphical manner, or otherwise based at least in part upon the time-dependent variability value 106.

Figure 5:
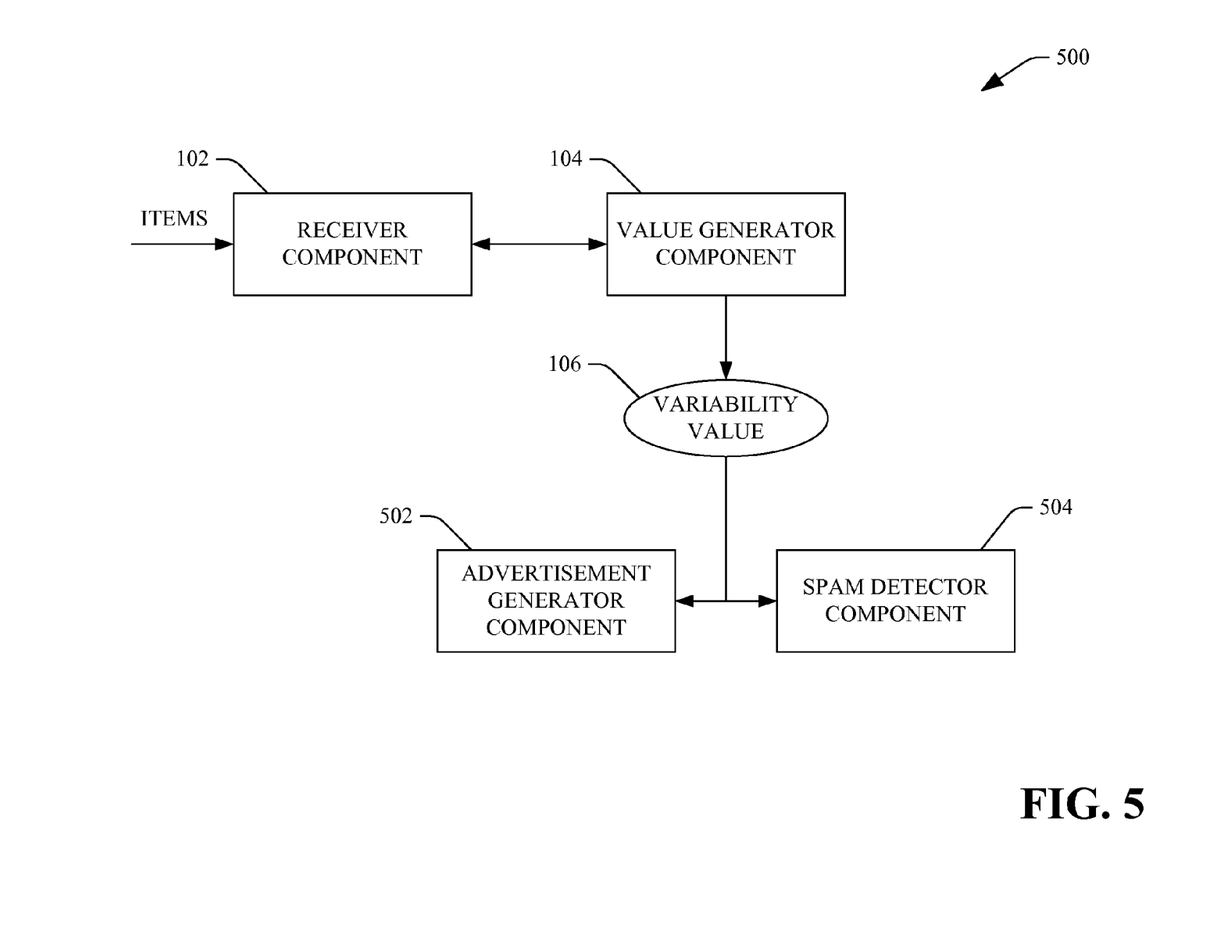
FIG. 5 is a functional block diagram of an example system that facilitates outputting an advertisement based at least in part upon a time-dependent variability value.

With reference now to FIG. 5, an example system 500 that facilitates computing a time-dependent variability value is illustrated. The system 500 includes the receiver component 102 and the value generator component 104 which act in conjunction to generate the time-dependent variability value 106 as described above. The system 500 further includes an advertisement generator component 502 that generates advertisements based at least in part upon the time-dependent variability value 106. For instance, the time-dependent variability value can indicate that an item has been the subject of recent increased interest (in comparison to historical interest of the item), and the advertisement generator component 502 can output an advertisement that is to be displayed on a graphical user interface based at least in part upon the time-dependent variability value 106.

In an example, an item may be a word in a message thread, and frequency of use of the word may be relatively high in comparison to historic frequency of use of the word. Such increased frequency may be reflected in the time-dependent variability value 106. Thus, even though the message thread may not be directed to topics related to the word, the course of discussion has altered to encompass one or more topics relating to the word. Advertisements corresponding to the word may therefore be relevant to authors of the message thread.

In another example, the items may be queries proffered to a search engine, wherein the time-dependent variability value 106 indicates a recent increase in frequency of a query term in comparison to historic use of the query term. The advertisement generator component 502 can increase a sale price for advertisements corresponding to the query term based at least in part upon the time-dependent variability value 106 for the query term, and can generate an advertisement upon receipt of the query term.

The system 500 may also include a spam detector component 504 that can label an item as spam based at least in part upon the time-dependent variability value 106. In an example, the item may be a word authored by a certain author in a message thread, and the time-dependent variability value 106 can indicate that such author has recently authored messages with a particular word more frequently than the author had used the word in the past. In addition, other time-dependent variability values may indicate that frequency of use of the word has not changed for messages authored by other authors. This discrepancy may indicate that the author is a spammer, and that one or more messages posted by the author are spam. The spam detector component 504, based at least in part upon the time-dependent variability value, can label an item and/or messages that include the item as spam.

Figure 6:
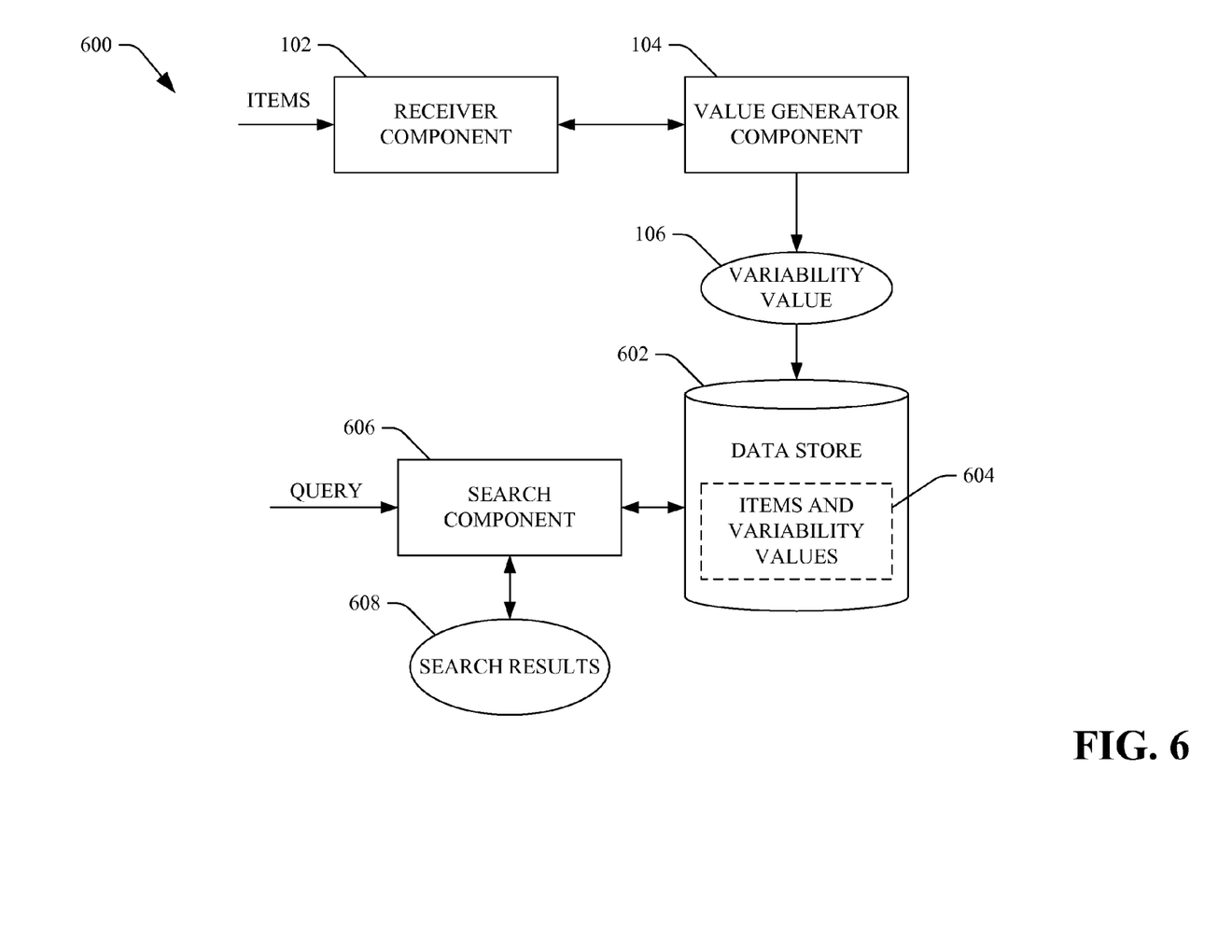
FIG. 6 is a functional block diagram of an example system that facilitates ordering search results based at least in part upon a time-dependent variability value.

With reference now to FIG. 6, an example system 600 that facilitates searching items in a data store and ranking search results based at least in part upon a time-dependent variability value is illustrated. The system 600 includes the receiver component 102 and the value generator component 104, which act together to generate the time-dependent variability value 106 as described above. A data store 602 can store time-dependent variability values and items corresponding to the values. In an example, the items may be web sites, and the time-dependent variability values can be indicative of changes in frequency of visits to one or more web sites. Thus, for example, the time-dependent variability value 106 can indicate that a web site has been visited more frequently over a recent period of time compared to historic frequency of visits to the web site. The data store 602 may include several time-dependent variability values and corresponding items 604.

The system 600 may further include a search component 606 that receives a query from a user. The search component 606 can act as a conventional search engine, for example, when determining which items are to be returned in response to the query as search results 608. In addition, the search component 606 can analyze time-dependent variability values when determining how to order the search results 608. For instance, the search component 606 can rank a first website higher than a second website due to a relatively high time-dependent variability value for the first web site (whereas the second website may have a relatively low time-dependent variability value).

With reference now to FIGS. 7-11, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. Further, it is to be understood that at least some of the acts may be supplemented by functionality, acts, and/or features described above.

Figure 7:
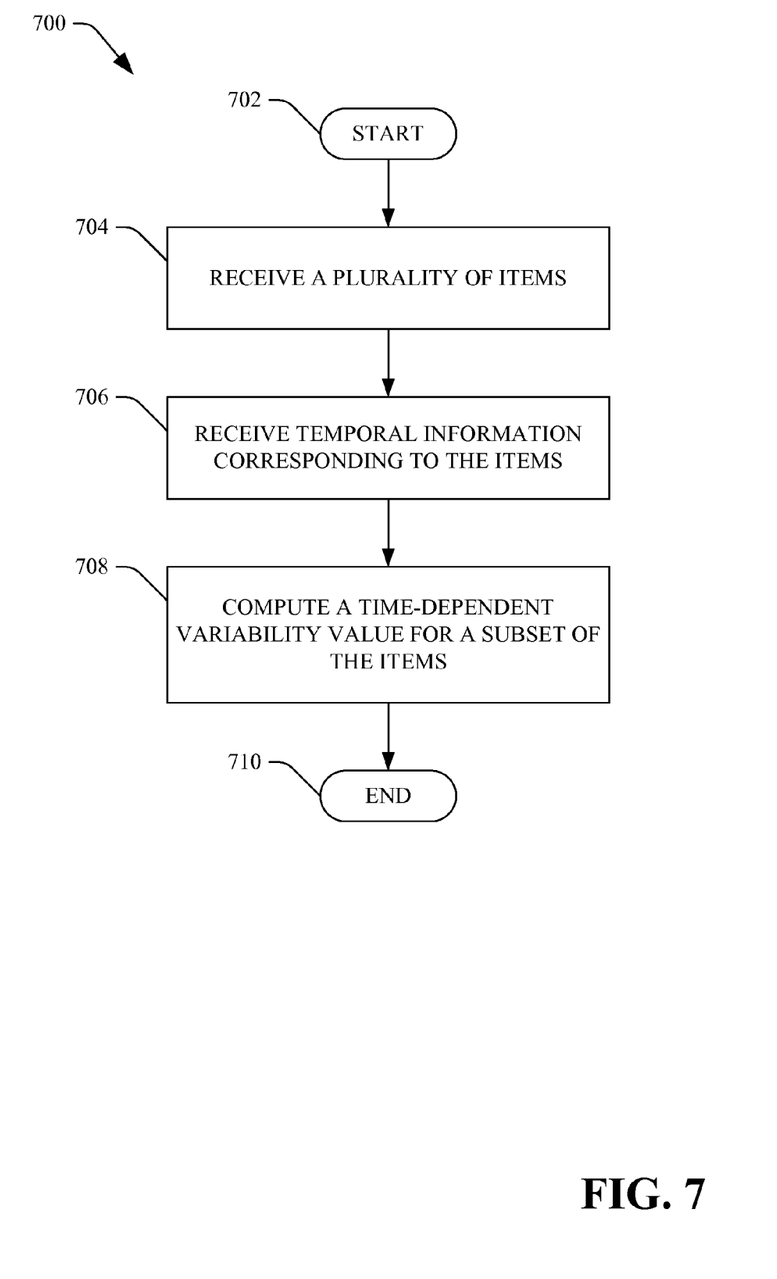
FIG. 7 is a flow diagram that illustrates an example methodology for computing a time-dependent variability value.

Referring specifically to FIG. 7, an example methodology 700 for computing a time-dependent variability metric is illustrated. The methodology 700 begins at 702, and at 704 a plurality of items are received. The items may be, for instance, words used in messages of a message thread, queries issued to a search engine, authors of a message thread, visits to web sites, etc.

At 706, temporal information corresponding to the plurality of items received at 704 is received. For instance, the temporal information may be timestamps that correspond to creation of the items. In a specific example, the temporal information may be timestamps corresponding to messages and words created in a message thread.

At 708, a time-dependent variability value is computed for a subset of the plurality of items based at least in part upon the temporal information corresponding to the items. The time-dependent variability value is indicative of a change in frequency of the subset of items amongst the received plurality of items relative to historic frequency of the subset of items in the received plurality of items. Example computation of time-dependent variability values has been described above. The methodology 700 completes at 710.

Figure 8:
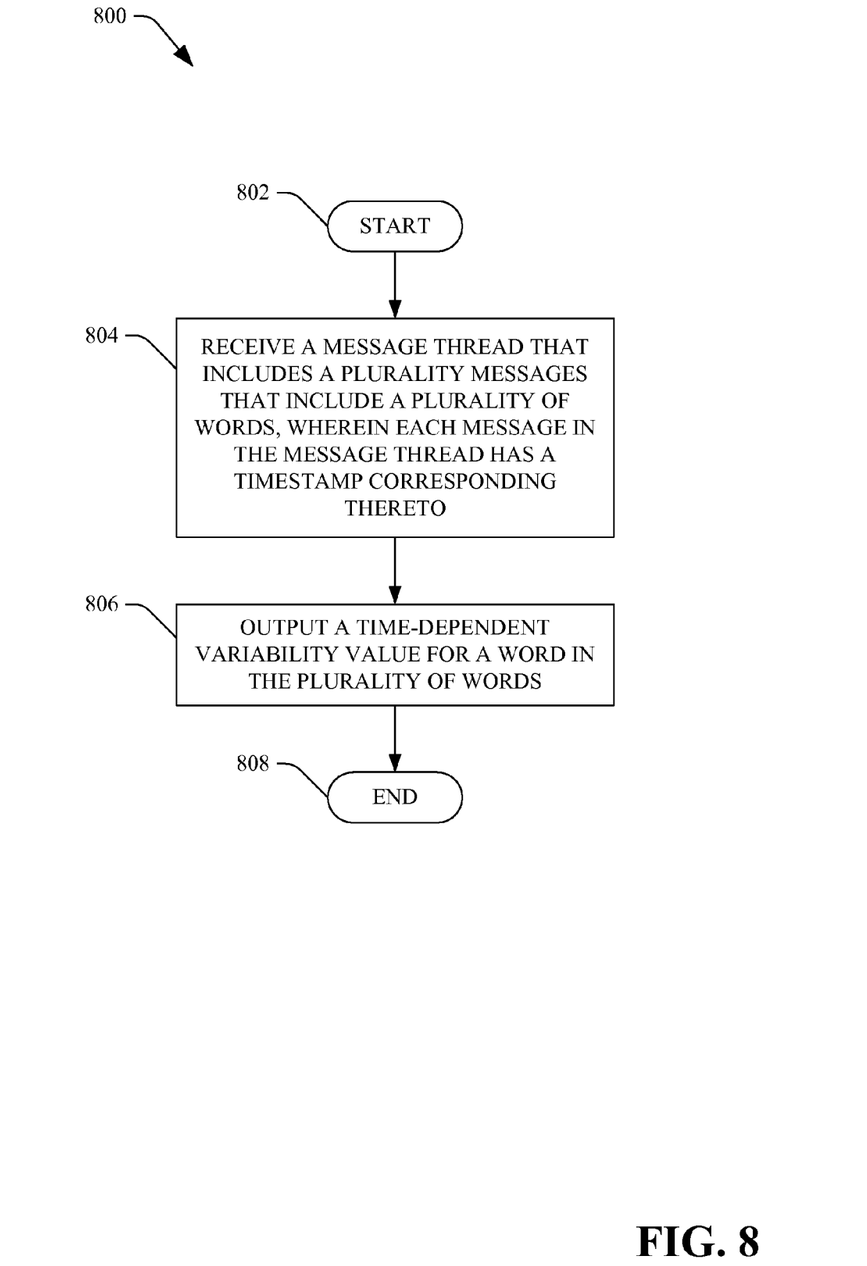
FIG. 8 is a flow diagram that illustrates an example methodology for computing a time-dependent variability value for a word used in a message thread.

Referring now to FIG. 8, an example methodology 800 for outputting a time-dependent variability value for a word in a message thread is illustrated. The methodology 800 starts at 802, and at 804 a message thread is received, wherein the message thread includes a plurality of messages that include a plurality of words. In addition, each message has a timestamp corresponding thereto. Pursuant to an example, timestamps corresponding to a particular word in a message thread can be analyzed, and a measure of difference between time-stamps can be ascertained. At 806, a time-dependent variability value is output for at least one word in the plurality of words. The time-dependent variability value may be based at least in part upon the ascertained measure of difference. The methodology 800 completes at 808.

Figure 9:
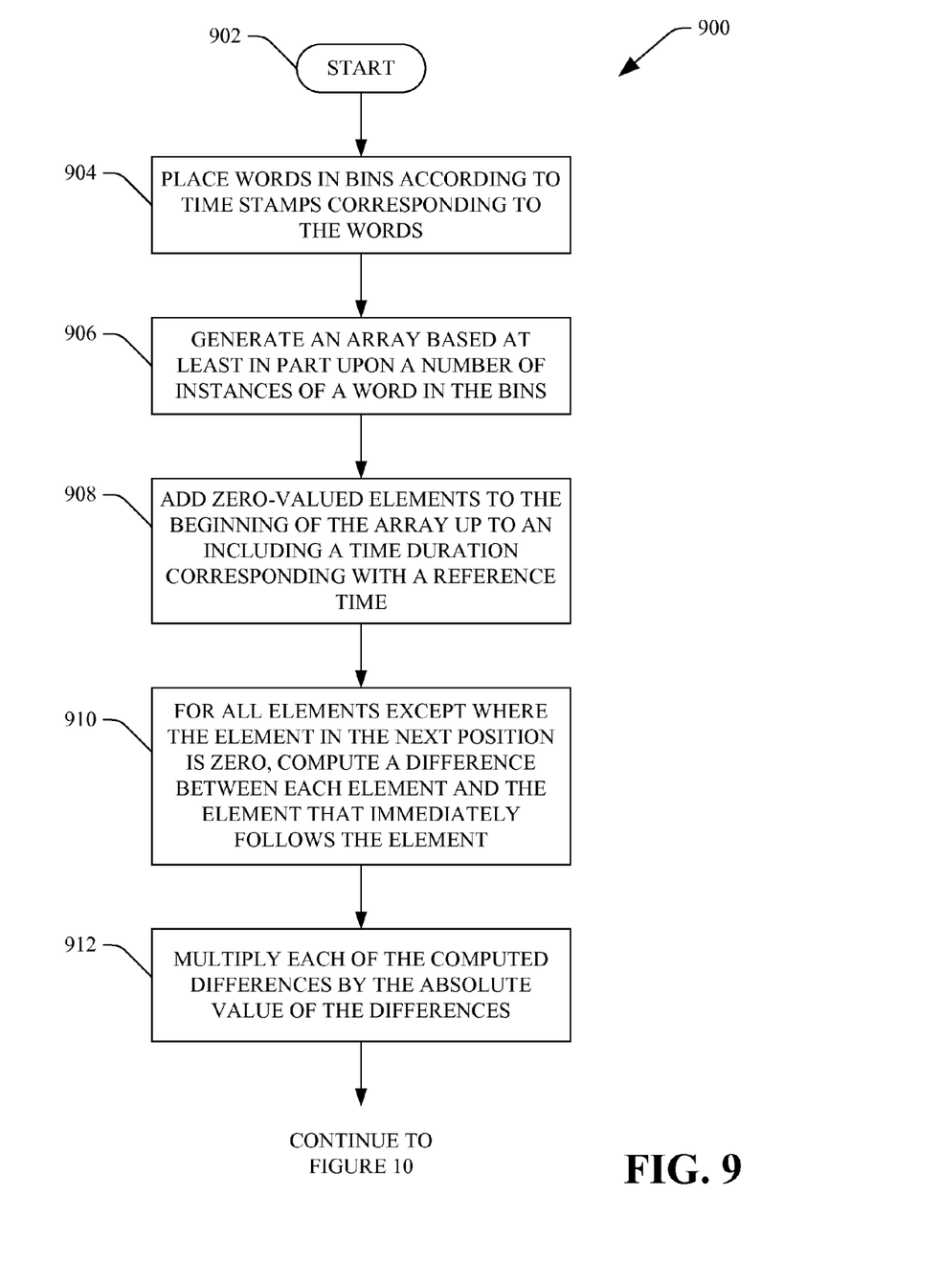
FIGS. 9 and 10 illustrate a flow diagram that depicts an example methodology for computing a time-dependent variability value.
Figure 10:
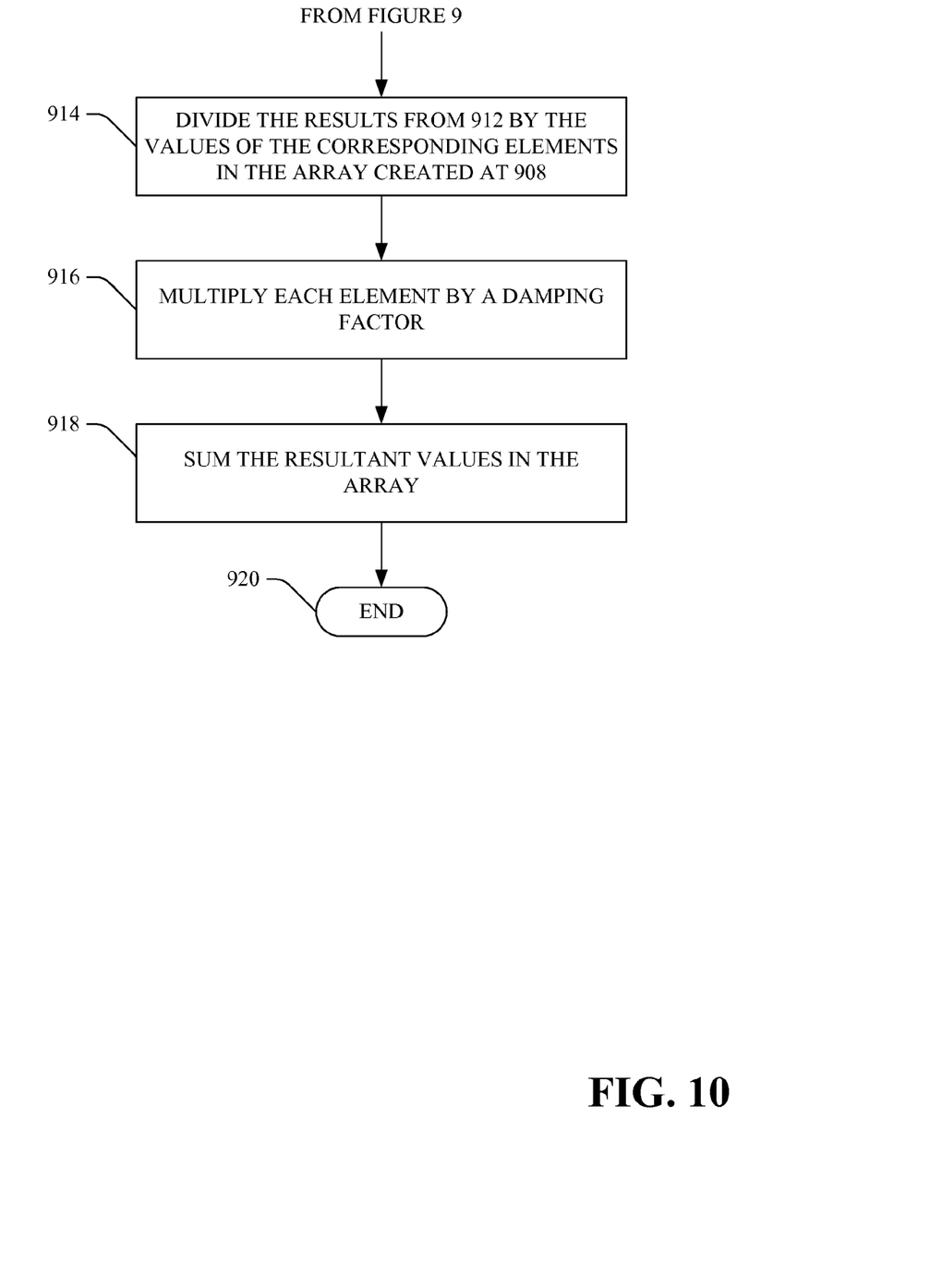

Now referring to FIGS. 9 and 10, an example methodology 900 for computing a time-dependent variability value is illustrated. The methodology 900 starts at 902, and at 904 words from a message thread are placed in storage bins according to timestamps corresponding to the words. For instance, a first word may have a timestamp that corresponds to a first time period, and such word may be placed in a first bin that corresponds to the first time period. A second word may have a timestamp that corresponds to a second time period, and such word may be placed in a second bin that corresponds to a second time period.

At 906, an array is generated based at least in part upon a number of instances of a word in a plurality of storage bins. For instance, an element in the array can be indicative of a number of instances of a word with respect to a time period corresponding to a position of the element in the array. Furthermore, elements in the array can be organized in a descending order of time periods. At 908, zero-valued elements are added to the beginning of the array up to and including a time duration corresponding to a reference time.

At 910, for all elements in the array except where the next element in the array is zero, a difference between each element and the element that immediately follows each element in the array is computed. At 912, each of the computed differences is multiplied by the absolute value of the differences.

At 914, the results from act 912 are divided by corresponding elements of the array created at act 908. At 916, each element of the array created at 914 is multiplied by a damping factor, and at 918 elements of the array created at act 916 are summed. The summation can be a time-dependent variability value for an item. The methodology 900 then completes at 920.

Figure 11:
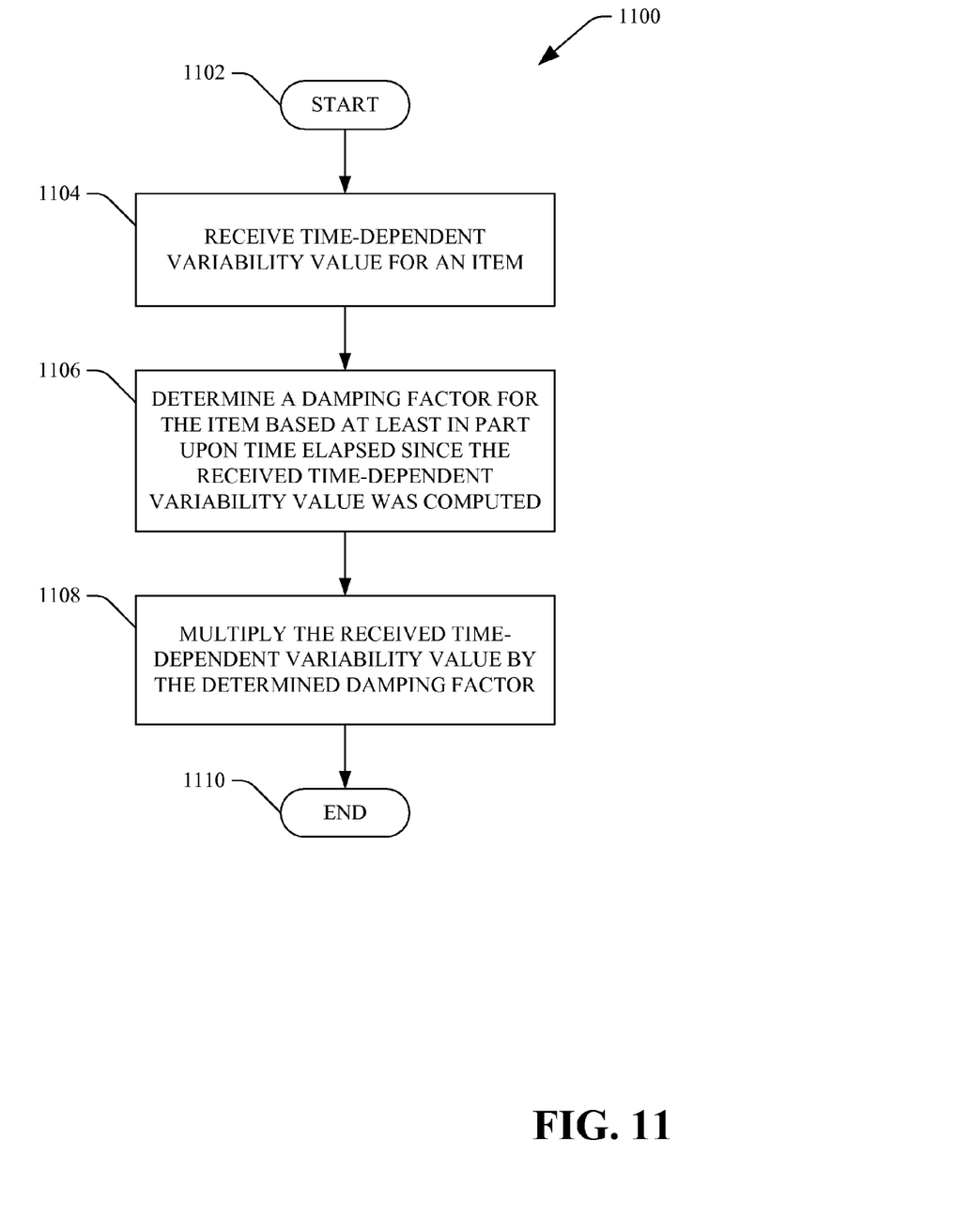
FIG. 11 is a flow diagram that illustrates an example methodology for updating a time-dependent variability value.

With reference now to FIG. 11, an example methodology 1100 for updating a time-dependent variability value is illustrated. The methodology 1100 starts at 1102, and at 1104 a time-dependent variability value for an item is received. At 1106, a damping factor for the item is determined based at least in part upon an amount of time that has elapsed since the time-dependent variability value was last computed. At 1108, the time-dependent variability value is multiplied by the determined damping factor. The methodology 1100 completes at 1110.

Figure 12:
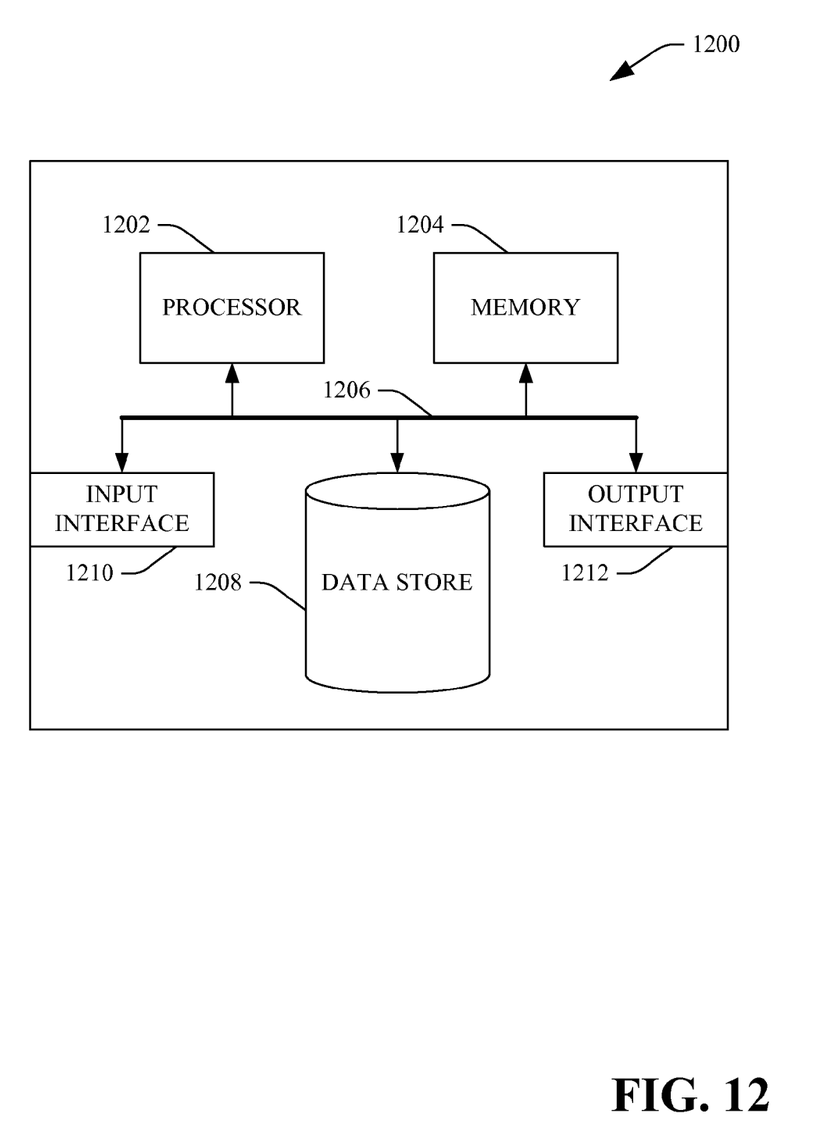
FIG. 12 is an example computing system.

Now referring to FIG. 12, a high-level illustration of an example computing device 1200 that can be used in accordance with the systems and methodologies disclosed herein is illustrated. For instance, the computing device 1200 may be used in connection with computing a time-dependent variability value or using a time-dependent variability value. Accordingly, the computing device 1200 may be or be included within a server system. In another example, the computing device 1200 may be or be included in a client device, such as a desktop computer, a laptop computer, a personal digital assistant, and the like. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. Additionally or alternatively, the instructions may be instructions for computing time-dependent variability values or using time-dependent variability values. The processor 1202 may access the memory by way of a system bus 1206. In addition to storing executable instructions, the memory 1204 may also store items, relationships between items, time-dependent variability values, etc.

The computing device 1200 additionally includes a data store 1208 that is accessible by the processor 1202 by way of the system bus 1206. The data store 1208 may include executable instructions, items, relationships, time-dependent variability values, etc. The computing device 1200 also includes an input interface 1210 that allows users or external devices to communicate with the computing device 1200. For instance, the input interface 1210 may be used to receive instructions from an external computer device, input or commands from a user, etc. The computing device 1200 also includes an output interface 1212 that interfaces the computing device 1200 with one or more external devices or allows information to be provided to a user. For example, the computing device 1200 may display items, time-dependent variability values, or the like by way of the output interface 1212.

Additionally, while illustrated as a single system, it is to be understood that the computing device 1200 may be a distributed system. Thus, for instance, several devices may be in communication by way of a network connection and may collectively perform tasks described as being performed by the computing device 1200.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Further, a component may be computer-executable.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:
1. A method, comprising:
receiving an array that comprises a plurality of values, wherein each value in the array is indicative of a number of occurrences of a word in a message thread over a time period that corresponds to said each value, wherein the plurality of values in the array are arranged based at least in part upon time periods corresponding to the plurality of values;
computing, utilizing a processor, a time-dependent variability value for the word based at least in part upon the plurality of values in the array, wherein the time-dependent variability value for the word is indicative of an alteration in frequency of occurrence of the word in the message thread relative to historic frequency of occurrence of the word in the message thread and wherein the processor computes the time-dependent variability value via the following algorithm:

$$p = \sum_{0}^{N-2} b_i,$$

$$\text{where } b_i = e^{-ki} \begin{cases} \dfrac{(a_i - a_{i+1})|a_i - a_{i+1}|}{a_{i+1}}, & a_{i+1} > 0 \\ a_i, & a_{i+1} = 0, \end{cases}$$

where p is the time-dependent variability value, N is a number of values in the array, $a_i$ is the ith value in the array, and k is a constant; and highlighting the word in the message thread based at least in part upon the time-dependent variability value for the word.

2. The method of claim 1, wherein consecutive values in the array correspond to consecutive time periods.

3. The method of claim 2, wherein the consecutive values in the array are arranged in chronologically descending order.

4. The method of claim 1, further comprising:
selecting an advertisement for presentment to a user based at least in part upon the time-dependent variability value for the word.

5. The method of claim 1, wherein said highlighting comprises graphically depicting the word beside a title of the message thread.

6. The method of claim 1, further comprising repeating said receiving, said computing, and said highlighting for a plurality of words in the message thread.

7. The method of claim 1, wherein the time periods corresponding to the plurality of values are days.

8. A system comprising:
a processor; and
a memory, wherein the memory comprises a plurality of components that are executable by the processor, the plurality of components comprising:
a receiver component that receives an array that comprises a plurality of values, wherein the array is indicative of frequencies of occurrence of an item over a plurality of consecutive time periods; and
a value generator component that computes a time-dependent variability value for the item based at least in part upon the plurality of values in the array, wherein the time-dependent variability value is indicative of alteration of frequencies of occurrence of the item relative to historic frequencies of occurrence of the item, and wherein the value generator component computes the time-dependent variability value for the item via the following algorithm:

$$p = \sum_{0}^{N-2} b_i,$$

$$\text{where } b_i = e^{-ki} \begin{cases} \dfrac{(a_i - a_{i+1})|a_i - a_{i+1}|}{a_{i+1}}, & a_{i+1} > 0 \\ a_i, & a_{i+1} = 0, \end{cases}$$

where p is the time-dependent variability value, N is a number of values in the array, $a_i$ is the ith value in the array, and k is a constant; and
an illustrator component that receives the time-dependent variability value and highlights the item based at least in part upon the time-dependent variability value of the item.

9. The system of claim 8, wherein the item is a word or phrase utilized in a message thread on a message board.

10. The system of claim 8, wherein the plurality of consecutive time periods are days.

11. The system of claim 8, wherein the plurality of values are arranged in the array in a chronologically descending order.

12. The system of claim 8, wherein the plurality of components further comprises a search component that ranks the web page amongst a plurality of search results based at least in part upon the time-dependent variability value.

13. The system of claim 8, wherein the plurality of components further comprises an advertisement generator component that sets a price for an advertisement based at least in part upon the time-dependent variability value.

14. The system of claim 8, wherein the item comprises a word utilized in a message thread, and wherein the illustrator component graphically depicts the word beside a title of the message thread based at least in part upon the time-dependent variability value.

15. The system of claim 8, wherein the item comprises a word utilized in a message thread, and wherein the plurality of components further comprise a spam detector component that labels a message in a message thread that includes the word as spam based at least in part upon the time-dependent variability value.

16. A non-transitory computer-readable memory comprising instructions that, when executed by a processor, cause the processor to perform acts comprising:
a) for a particular time period, counting a number of occurrences of a word in a message thread;
b) repeating said counting for the word for a plurality of time periods to generate a plurality of counts of occurrences of the word in the message thread over the plurality of time periods;
c) based at least in part upon the plurality of counts, computing a time-dependent variability value for the word, wherein the time-dependent variability value for the word is indicative of alterations in frequencies of occurrences of the word in the message thread relative to historic frequencies of occurrences of the word in the message thread, and wherein the time-dependent variability value for the word is computed via the following algorithm:

$$p = \sum_{0}^{N-2} b_i,$$

$$\text{where } b_i = e^{-ki} \begin{cases} \dfrac{(a_i - a_{i+1})|a_i - a_{i+1}|}{a_{i+1}}, & a_{i+1} > 0 \\ a_i, & a_{i+1} = 0, \end{cases}$$

where p is the time-dependent variability value, N is a number of values in the array, $a_i$ is the ith value in the array, and k is a constant; and
d) highlighting the word in the message thread based at least in part upon the time-dependent variability value for the word.

17. The non-transitory computer-readable memory of claim 16, wherein the particular time period is a day.

* * * * *